C. W. Cotton,
Fastening Augers to Handles.
N° 12,575. Patented Mar. 20, 1855.
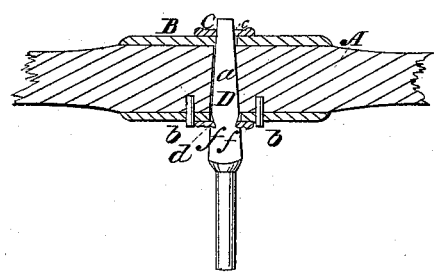
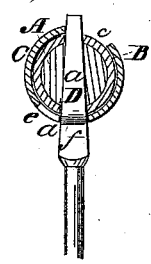
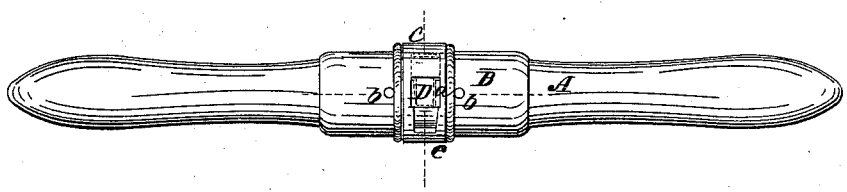

UNITED STATES PATENT OFFICE.

CHARLES W. COTTON, OF SHELBURNE FALLS, MASSACHUSETTS.

ATTACHING AUGERS TO HANDLES.

Specification of Letters Patent No. 12,575, dated March 20, 1855.

*To all whom it may concern:*

Be it known that I, CHARLES W. COTTON, of Shelburne Falls, in the county of Franklin and State of Massachusetts, have invented a new and Improved Mode of Attaching Augers to Handles; and I do hereby declare that the following is a full, clear, and exact description of the same, reference being had to the annexed drawings, making a part of this specification, in which—

Figure 1, is a longitudinal section of the center portion of an auger handle, the shank of the auger being secured thereto by my improved mode. Fig. 2, is a transverse section of ditto, the plane of section being through the center. Fig. 3, is an inverted plan or under view of ditto.

Similar letters of reference indicate corresponding parts in the several figures.

The nature of my invention consists in placing a metallic tube around the center of the auger handle and having a taper hole made entirely through the handle and tube in which hole the shank of the auger is placed. A metallic band is placed around the tube and works loosely on it, the shank passing through slots in the band, the lower slot being somewhat taper and its edges fitting in grooves in the sides of the shank when the band is turned, thereby securing the auger to the handle.

To enable others skilled in the art to fully understand and construct my invention, I will proceed to describe it.

A, represents the auger handle which may be constructed of wood, and B, is the metallic tube which is secured on the handle at about its center. Transversely through the center of the handle A, and tube B, there is made a taper hole (*a*) of rectangular form as clearly shown in Figs. 1 and 2. Around the center of the tube B, there is placed a metallic band C, which works between pins (*b*) (*b*) see Figs. 1 and 3, said pins also serving to secure the tube B, to the handle A.

The band C, is allowed to turn loosely on the tube B, and has two slots (*c*) (*d*) made through it at opposite points, the slot (*c*) being oblong but corresponding in width to the upper part of the shank of the auger. The slot (*d*) is also oblong and one part of it corresponds in width to the lower part of the shank and the other part see (*e*) Fig. 3, is of taper form and narrower than the shank.

D, is the shank of the auger of taper rectangular form corresponding in size to the hole (*a*) in the handle A. The lower part of the shank has notches or grooves (*f*) (*f*) in it at opposite sides, see Figs. 1 and 2.

The Auger is secured to the handle in the following manner. The band C, is turned till the widest part of the slot (*d*) in the band is directly over the lower end of the hole (*a*) in the handle A and tube B, and the shank D, is then inserted in the hole (*a*), the band C, is then turned and the edges of the taper portion (*e*) of the slot (*d*) fit in the notches or recesses (*f*) (*f*) in the sides of the shank D, and of course secure the auger to the handle.

The above improvement is extremely simple, and economical to manufacture, and forms a secure fastening. And the augers may be attached to or detached from their handles with the greatest facility.

What I claim as new and desire to secure by Letters Patent, is—

Attaching or securing augers to handles by having a metallic tube B, placed around the center of the handle and having a transverse rectangular taper hole (*a*) made through the handle and tube, and a metallic band C, placed around the tube B, and turning loosely thereon, said band having slots (*c*) (*d*) made through it, a part of the slot (*d*) being of taper form. The shank of the auger being placed in the hole (*a*) and through the slots (*c*) (*d*) in the band and secured in the handle by turning said band and causing the edges of the taper portion of the slot (*d*) to pass in the notches or recesses (*f*) (*f*) in the shank as herein shown and described.

CHARLES W. COTTON.

Witnesses:
GEO. W. MIRICK,
ZEBULON W. FIELD.